United States Patent [19]
DeBrunner et al.

[11] 3,879,343
[45] Apr. 22, 1975

[54] STABILIZING HYDROCARBON COPOLYMERS OF BICYCLIC MONOMERS AGAINST GELATION DURING BULK PROCESSING

[75] Inventors: Marjorie Ruth DeBrunner; John Joseph Verbanc, both of Wilmington, Del.

[73] Assignee: E. I. du Pont de Nemours and Company, Wilmington, Del.

[22] Filed: May 30, 1973

[21] Appl. No.: 365,869

Related U.S. Application Data

[63] Continuation-in-part of Ser. Nos. 836,154, June 24, 1969, abandoned, and Ser. No. 152,403, June 11, 1971, abandoned.

[52] U.S. Cl. ... 260/45.7 S; 260/45.8 N; 260/45.9 R; 260/79.5 B; 260/80.78; 260/88.2 D

[51] Int. Cl............................................. C08d 11/04
[58] Field of Search...... 260/45.8 N, 45.7 S, 45.9 R, 260/80.78, 88.2 D, 79.5 B

[56] References Cited
UNITED STATES PATENTS

| | | | |
|---|---|---|---|
| 3,093,620 | 6/1963 | Karcher et al. | 260/79.5 B |
| 3,467,633 | 9/1969 | Harris et al. | 260/80.78 |
| 3,531,447 | 9/1970 | Gumbolt et al. | 260/80.78 |

*Primary Examiner*—Melvyn I. Marquis

[57] ABSTRACT

Normally solid α-monoolefin hydrocarbon copolymers containing norbornylene groups or substituted derivatives thereof are stabilized against gelation during bulk processing by the addition of a thiuram disulfide or a xanthogen disulfide.

14 Claims, No Drawings

STABILIZING HYDROCARBON COPOLYMERS OF BICYCLIC MONOMERS AGAINST GELATION DURING BULK PROCESSING

BACKGROUND OF THE INVENTION

This application is a continuation-in-part of application Ser. No. 836,154, filed June 24, 1969 and Ser. No. 152,403 filed June 11, 1971, both abandoned.

$\alpha$-Monoolefin hydrocarbon copolymers containing norbornylene groups and substituted derivatives thereof are excellent general purpose elastomers; however, they are difficult to process and convert into finished goods. One particular problem which occurs during processing is that the shear stresses incurred at temperatures below about 95°C. during processing are sufficient to rupture the norbornane ring which in the absence of a proper stabilizer will induce self crosslinking and result in gelation of the polymer. Gelation adversely affects the properties of the polymer causing a decrease in solubility, tack, and flow, and further processing is very difficult and impractical.

The harmful shearing stresses causing rupture of the norbornylene group can occur (a) during the compounding step wherein these polymers are mixed with fillers, plasticizers, curing agents, and antioxidants, (b) during the shaping and/or molding operations wherein the polymer is forced to flow on mills and calenders or through extruders and injection molding equipment, and (c) during polymer isolation. In most instances, these operations are not consecutive; hence, the stock may be run through the cycle of heating, cooling, and shearing several times during processing, each operation providing an opportunity for gelation to occur. In addition to the problems created through shearing, the uncured scrap which has been through the complex processing cycle must be reused in order to make the process economical, but norbornene copolymer scrap which has been adversely affected by the shearing cycles is not reusable.

Because of the processing deficiencies described above, $\alpha$-monoolefin hydrocarbon copolymers containing norbornylene groups or substituted derivatives thereof are commercially unacceptable and uneconomical for use in producing certain products such as tires, despite their convenient synthesis and their significant potential economic value. There is a need, therefore, for a means of stabilizing an $\alpha$-monoolefin hydrocarbon copolymer containing norbornylene groups or substituted derivatives thereof against gelation during the shearing phases of bulk processing.

SUMMARY OF THE INVENTION

This invention provides a process for stabilizing a normally solid $\alpha$-monoolefin hydrocarbon copolymer composition containing (1) about 2–50% by weight of norbornylene groups or substituted derivatives thereof by means of a stabilizer which protects the copolymer against gelation during the shearing phases of bulk processing, said stabilizer being (a) a thiuram disulfide or (b) a xanthogen disulfide.

DETAILS OF THE INVENTION

The stabilizers useful in this invention are:
a. a thiuram disulfide having the formula:

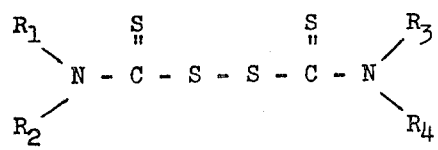

where $R_1$, $R_2$, $R_3$, and $R_4$ are independently $C_1$–$C_{18}$ alkyl (for convenience and economic reasons are preferably $C_1$–$C_4$ alkyl); $C_6$–$C_{18}$ aryl (and saturated derivatives thereof); $C_7$–$C_{18}$ alkaryl (e.g., tolyl); $C_7$–$C_{18}$ aralkyl (e.g. benzyl); or a pair of R's on the same N atom can be $C_4$–$C_5$ alkylene or 3-oxapentylene; or b. a xanthogen disulfide having the formula:

where $R_5$ and $R_6$ are independently $C_1$–$C_{18}$ alkyl (for convenience and economic reasons are preferably $C_2$–$C_{12}$ alkyl); $C_6$–$C_{18}$ aryl (and saturated derivatives thereof); $C_7$–$C_{18}$ alkaryl (e.g., tolyl); or $C_7$–$C_{18}$ aralkyl (e.g., benzyl).

Representative and preferred thiuram disulfide compounds are: tetramethylthiuram disulfide; tetraethylthiuram disulfide; tetrabutylthiuram disulfide; dipentamethylenethiuram disulfide; N,N'-dimethyl-N,N'-diphenylthiuram disulfide; N,N'-diethyl-N,N'-diphenylthiuram disulfide; N,N'-diethyl-N,N'-dicyclohexylthiuram disulfide; tetrabenzylthiuram disulfide; dicyclohexylthiuram disulfide; tetrabenzylthiuram disulfide; bis(morpholino) thiuram disulfide; and bis(piperidino)thiuram disulfide.

Representative and preferred xanthogen disulfide compounds are:

dimethyl xanthogen disulfide
diethyl xanthogen disulfide
dipropyl xanthogen disulfide
diisopropyl xanthogen disulfide
dibutyl xanthogen disulfide
dibenzyl xanthogen disulfide
diisobutyl xanthogen disulfide
diisopentyl xanthogen disulfide
dicyclohexyl xanthogen disulfide
diphenyl xanthogen disulfide
benzylbutyl xanthogen disulfide
butylcyclohexyl xanthogen disulfide
butylmethyl xanthogen disulfide
butylethyl xanthogen disulfide
cyclohexylmethyl xanthogen disulfide
ethylphenyl xanthogen disulfide
methylphenyl xanthogen disulfide The stabilizers of this invention are bi-functional; thus, stoichiometrically, one mole of stabilizer should be provided per mole of norbornylene moiety present in the copolymer. However, an improvement results when the amount of stabilizer incorporated in the polymer is within the range of about 2–100 mole %, and preferably 2–12 mole % of the actual concentration of norbornylene or substituted derivative present in the polymer.

This invention is applicable to normally solid linear and branched copolymers where one comonomer is a norbornene incorporated in the backbone of the polymer chain (as indicated by the wavy line) in the form of a norbornylene group:

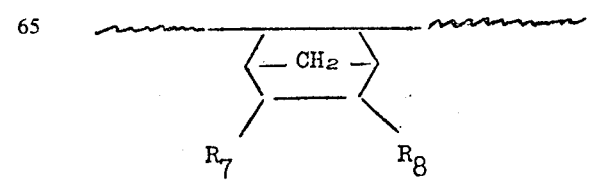

The norbornene has the general formula:

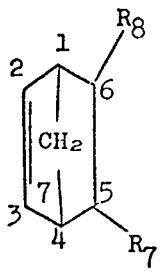

where $R_7$ is hydrogen, $C_1$–$C_{16}$ alkyl, $C_6$–$C_{18}$ aryl, $C_2$–$C_{12}$ alkenyl; $R_8$ is hydrogen or $C_1$–$C_{16}$ alkyl; or $R_7$ and $R_8$ can be joined to form a $C_3$–$C_4$ alkylene group or a $C_3$–$C_4$ alkenylene group.

Representative examples include 2-norbornene; 5-methyl-2-norbornene; 5-phenyl-norbornene; dicyclopentadiene and 5-(2'-butenyl)-2-norbornene.

The concentration of norbornylene and its derivatives can vary from 2–50% by weight. Where the norbornylene derivative contains unsaturated groups such as alkenyl, or alkenylene, 2–15 weight percent is preferred because the presence of a greater amount of unsaturated groups is usually unnecessary for adequate curing. In those cases where the norbornylene derivative is saturated the preferred concentration is 5–40 weight percent for practical and economic reasons. When the amount of norbornylene groups exceeds 40 weight percent, the resulting product tends to behave more like a plastic than an elastomer.

Other monomers useful in preparing the copolymers of this invention are α-monoolefins having the structure

$$R_9 - CH = CH_2$$

where $R_9$ is hydrogen or $C_1$–$C_{16}$ alkyl, preferably straight chain. Representative α-monoolefins are ethylene, propylene, 1-butene, 1-pentene, 1-hexene, 1-heptene, 1-octene, 1-octadecene, 5-ethyl-1-decene, and 5-methyl-1-hexene. Still another monomer useful in this invention is a nonconjugated diene which may be an open chain or cyclic compound, having only one polymerizable double bond in the sense that only one bond of the diene reacts to a substantial degree in forming the polymer backbone. Terminal double bonds and the endocyclic double bond at the 2-position in unsaturated derivatives of 2-norbornene are typical of such active bonds. The open-chain dienes have the general formula:

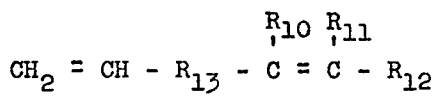

$$CH_2 = CH - R_{13} - C = C - R_{12}$$
with $R_{10}$, $R_{11}$ above the carbons.

wherein $R_{13}$ is $C_1$–$C_{18}$ alkylene radical and $R_{10}$, $R_{11}$, and $R_{12}$ are independently selected from hydrogen or alkyl radicals provided the R groups ($R_{10}$, $R_{11}$, $R_{12}$, and $R_{13}$) are selected such that the diene has about $C_6$–$C_{22}$ carbon atoms. The preferred species is 1,4-hexadiene. Representative dienes are 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,10-dodecadiene; 12-ethyl-1,12-tetradecadiene; 13-n-butyl-1,12-heptadecadiene; and 15-ethyl-1,15-heptadecadiene. Open-chain dienes having two terminal nonconjugated carbon-to-carbon double bonds where $R_{14}$, $R_{15}$, and $R_{16}$ are hydrogen, e.g., 1,5-hexadiene or 1,4-pentadiene, can be used provided care is taken to avoid gelation during the copolymerization. Cyclic nonconjugated dienes include dicyclopentadiene, 5-alkenyl-substituted-2-norbornenes, e.g., 5-(2'-butenyl)-2-norbornene, 5-alkylidene-2-norbornenes (including 5-ethylidene-2-norbornene and 5-methylene-2-norbornene), 2-alkyl-2,5-norbornadienes, (e.g., 2-ethyl-2,5-norbornadiene) and 1,5-cyclooctadiene.

The above monomers can be combined to form a variety of copolymers.

Representative copolymers are: ethylene/norbornene; ethylene/5-methyl-2-norbornene; ethylene/5-butyl-2norbornene/5-ethylidene-2-norbornene; ethylene/propylene/dicyclopentadiene; ethylene/norbornene/1,4-hexadiene; ethylene/propylene/norbornene/1,4-hexadiene; ethylene/propylene/5-methylene norbornene/dicyclopentadiene; ethylene/propylene/5-(2'-butenyl)-2-norbornene; ethylene/5-hexyl norbornene; and ethylene/5-methyl norbornene/1,4-hexadiene.

Other useful copolymers are made from the above-described monomers and methods for their preparation are given in U.S. Pat. Nos. 2,799,688; 2,883,372; 2,934,527; and British Pat. No. 1,014,311.

The copolymers of the present invention can be made by contacting the monomers with conventional coordination catalysts, which are preferably soluble in inert organic solvents such as tetrachloroethylene, hexane, benzene, and cyclohexane.

The preferred catalysts consists of the reaction product of: (1) a vanadium compound such as $VOCl_3$, $VCl_4$, vanadium tris-(acetylacetonate), vanadium oxybis(acetylacetonate), trialkylorthovanadates (such as triethylorthovanadate) and (2) an organo metallic reducing agent, particularly organoaluminum compounds of which the diorganoaluminum chlorides (such as diisobutylaluminum chloride) are preferred. $TiCl_4$ can be used in place of the vanadium compounds. One of the catalyst components should contain halogen, preferably chlorine, unless the halogen is supplied by the reaction medium.

The copolymers to be stabilized by the additives of this invention are prepared in solution or as a slurry in the presence of a polymerization catalyst by conventional techniques. Preferably, the stabilizers of this invention are added to the copolymer solution before isolation of the copolymer occurs. The copolymer can be isolated from solution either by precipitation with a nonsolvent or by removal of the solvent by steam distillation or by other conventional means.

Incorporation of the stabilizers into the polymer is preferentially accomplished before isolation; but, as demonstrated in the examples, it can also be achieved successfully by milling or mixing procedures wherein the polymer and equipment are both heated within the range of about 80°–100°C. This method of incorporating the stabilizer can be carried out successfully on a small scale but is much more difficult to achieve on a large scale.

The stabilized copolymer can be compounded on a rubber mill, in an internal mixer (e.g., Banbury mixer, a Struthers-Wells mixer) or by other conventional mixing means. Conventional materials can be added at this time such as fillers, e.g., carbon black, clay, silica, curing agents, antioxidants, oils, pigments, etc. The latter are not necessary to gain the advantages of this invention. Curing is thereafter effected by conventional methods and under the usual conditions.

The following examples illustrate this invention. All parts, percentages, and proportions are by weight unless otherwise indicated.

Test Procedures

A. Comparative plasticities are easily determined by Wallace Plasticity measurements. These are made on a Wallace Plastimeter, manufactured by H. W. Wallace & Co., Limited, London. The Wallace Plasticity is a measure of the amount of flow or deformation under load of unvulcanized elastomeric material. The polymer to be tested is sheeted and cut into pellets having a thickness in the range of 125–130 mils (that is, 3.175 to 3.30 mm.). Initially, for a 10-second period, the test pellet is compressed to a thickness of exactly one millimeter and heated to 100°C. Then the test pellet is subjected to a 10-kilogram load for 15 seconds at 100°C. The final thickness of the test piece, expressed in units of 0.01 millimeter, is the plasticity reading.

B. Insoluble polymer content is determined by extracting finely cut polymer samples for 3 hours with boiling n-hexane (if the polymer is non-crystalline) or with boiling n-heptane (if the polymer is partly crystalline), decanting the clear liquor into a tare-pan, taking care to leave insoluble polymer behind for weighing. The residue is extracted four more times. The percent insoluble polymer = (weight of insoluble polymer/sample weight) × 100. Typically, a 5-gram polymer sample is cut into cubes about ⅛-inch on a side and extracted with 200 ml. of solvent.

EXAMPLE 1

A 20-gram portion of a normally solid, substantially amorphous copolymer of ethylene/2-norbornene/1,4-hexadiene (57/41/2 weight percent; a Wallace Plasticity of 81) is warmed to approximately 80°C. then placed on a rubber mill that has also been heated to 80°C. As the copolymer is banded on the mill, a 0.4-gram portion of diethyl xanthogen disulfide is added. The copolymer is milled for 10 minutes. A smooth transparent copolymer forms on the front of the mill and exhibits a good rolling bank. The Wallace Plasticity after milling is 87.

For purposes of comparison, a second 20-gram sample of the same copolymer is treated in the same fashion as described above except that no diethyl xanthogen disulfide is added. This comparative sample bands initially; however, within the first few minutes of milling the copolymer begins to crumble and shred from the mill. The Wallace Plasticity of the shredded material is too high to be measured by the testing equipment which has a maximum value of 100.

EXAMPLE 2

A 20-gram portion of a normally solid, substantially amorphous copolymer of ethylene/5-methyl-2-norbornene (62/38 weight percent containing approximately 0.1 weight percent hexane-insoluble polymer) having a Wallace Plasticity of 16 is warmed to 95°c. and placed on a rubber mill which has also been warmed to 95°C. Two grams of tetramethyl thiuram disulfide are added to the copolymer as it is banded onto the mill. The copolymer is milled at 95°C. for 15 minutes and has a Wallace Plasticity of 13. The same sample is then banded onto a rubber mill at room temperature and milled for 15 minutes. The copolymer sample then has a Wallace Plasticity of 15 and only about 3 weight percent of the polymer is insoluble in hexane.

For purposes of showing that another type of disulfide is ineffective in eliminating gelling of the copolymer, the above experiment is conducted in the same manner as described above except that dipentamethylenethiuram hexasulfide is used in place of tetramethylthiuram disulfide. The Wallace Plasticity of the resultant copolymer after room temperature milling rises sharply to 47 showing that no protection is afforded the copolymer during cooling and milling; and furthermore, the copolymer is insoluble in hot hexane.

EXAMPLE 3

A normally solid, substantially amorphous copolymer of ethylene/5-methyl-2-norbornene (62/38 weight percent containing approximately 1% hexane-insoluble polymer) is prepared by solution polymerization and immediately prior to isolation of the copolymer 8.75 parts of diethyl xanthogen disulfide is added per 100 parts of copolymer. A 20-gram sample of this isolated copolymer having a Wallace Plasticity of 11 is heated to 95°C. and banded on a rubber mill which has also been heated to 95°C. The rubber mill is run for approximately 15 minutes and then cooled to room temperature. Thereafter, the copolymer is milled at room temperature for 15 minutes. The milled copolymer has a Wallace Plasticity of 5 and contains approximately 0.2% hexane-insoluble copolymer.

For comparative purposes, a copolymer is prepared in accordance with the above procedure; however, no diethyl xanthogen disulfide is added to the copolymer solution. After milling at 95°C. for 15 minutes, the isolated copolymer has a Wallace Plasticity of 11. After milling at room temperature for 15 minutes, the same sample has a Wallace Plasticity of 15 and contains 25 weight percent of hexane-insoluble material.

EXAMPLE 4

A 20-gram sample of a normally solid, substantially amorphous copolymer of ethylene/propylene/norbornene/1,4-hexadiene (60/29/8/3 weight percent) having a Wallace Plasticity of 40 is warmed to 95°C. and banded on a rubber mill which has also been heated to 95°C. A 0.4-gram portion of diethyl xanthogen disulfide is added to the copolymer and milling continued for 15 minutes. The resulting copolymer still has a Wallace Plasticity of 40. The rubber mill is then cooled and the copolymer milled at room temperature for 15 minutes. The resultant copolymer is translucent throughout the entire procedure, has a final Wallace Plasticity of 32 and contains 0.1 weight percent hexane-insoluble copolymer.

For comparative purposes, a second sample of copolymer is prepared as described above with the exception that no diethyl xanthogen disulfide is added. After milling for 15 minutes at 95°C. the copolymer still has a Wallace Plasticity of 40. After milling at room temperature for 15 minutes, however, the copolymer band becomes opaque, the surface is grainy, the Wallace Plasticity has risen to 73, and the sample contains 38 weight percent hexane-insoluble copolymer.

We claim:

1. In a process of stabilizing against gelation, during the shearing phases of bulk processing, a normally solid elastomeric hydrocarbon copolymer prepared from a monomer mixture comprising an α-monoolefin and a norbornene having the general formula:

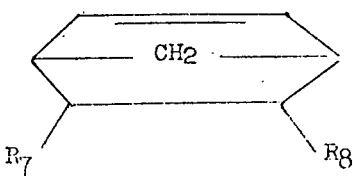

where $R_7$ is hydrogen alkyl, aryl, or alkenyl, $R_8$ is hydrogen or alkyl, or $R_7$ and $R_8$ are joined to form an alkylene group, the improvement which comprises mixing with said copolymer before bulk processing thereof under conditions of shear effective to cause substantial gelation thereof, about 2–100 mole %, per mole of norbornylene moities in the copolymer of a stabilizer selected from the group consisting of (a) a thiuram disulfide having the general formula

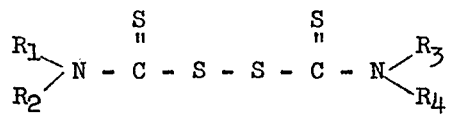

where $R_1$, $R_2$, $R_3$, and $R_4$ are independently $C_1$–$C_{18}$ alkyl, $C_6$–$C_{18}$ aryl and saturated derivatives thereof, alkaryl, and aralkyl, and wherein a pair of R's on the same N atom can be $C_4$–$C_5$ alkylene or 3-oxapentalene, and (b) a xanthogen disulfide having the general formula:

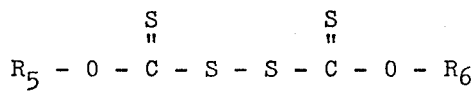

where $R_5$ and $R_6$ are independently selected from the group consisting of $C_1$–$C_{18}$ alkyl, $C_6$–$C_{18}$ aryl and saturated derivatives thereof, alkaryl, and aralkyl.

2. The process of claim 1 in which the copolymer contains 2–15 weight percent unsaturated norbornylene derivatives having the general formula:

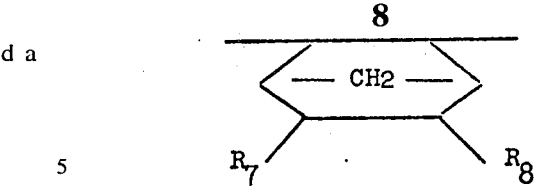

where $R_7$ is alkenyl, or $R_7$ and $R_8$ are alkenylene.

3. The process of claim 1 in which the norbornylene groups or substituted derivatives thereof are present in the amount of about 5 to 40 weight percent.

4. The process of claim 3 in which the thiuram disulfide is selected from the group consisting of tetraethylthiuram disulfide, tetrabutylthiuram disulfide, and tetramethylthiuram disulfide.

5. The process of claim 3 in which the xanthogen disulfide is selected from the group consisting of diisopropyl xanthogen disulfide, diethyl xanthogen disulfide, and didodecyl xanthogen disulfide.

6. The process of claim 1 in which the copolymer is prepared from ethylene/propylene/norbornene/1,4-hexadiene.

7. The process of claim 1 in which the copolymer is prepared from ethylene/5-methyl-2-norbornene/1,4-hexadiene.

8. The process of claim 1 in which the copolymer is prepared from ethylene/5-butyl-2-norobornene/5-ethylidene-2-norbornene.

9. The process of claim 8 in which the stabilizer is tetramethylthiuram disulfide.

10. The process of claim 8 in which the stabilizer is diethyl xanthogen disulfide.

11. The process of claim 1 wherein said copolymer is a copolymer of ethylene and said norbornene.

12. The process of claim 1 wherein said stabilizer is added to the copolymer before the latter is isolated from the solution or slurry in which it is prepared.

13. The process of claim 12 wherein said stabilizer is a xanthogen disulfide.

14. The process of claim 1 wherein stabilizer is added to the copolymer after the latter is isolated from the solution or slurry in which it is prepared.

* * * * *